United States Patent [19]

Koike

[11] Patent Number: 5,408,338
[45] Date of Patent: Apr. 18, 1995

[54] IMAGE PROCESSING UNIT PROCESSING PIXEL DATA ACCORDING TO SCAN LINE DENSITY

[75] Inventor: Kazumasa Koike, Atsugi, Japan

[73] Assignee: Ricoh Company, Ltd., Tokyo, Japan

[21] Appl. No.: 18,514

[22] Filed: Feb. 17, 1993

[30] Foreign Application Priority Data

Feb. 19, 1992 [JP] Japan .................. 4-69829

[51] Int. Cl.$^6$ .................. G06K 9/40; H04N 1/40; H04N 1/393; H04N 1/387
[52] U.S. Cl. .................. 358/448; 358/447; 358/451; 358/453; 358/456; 382/54
[58] Field of Search .......... 358/448, 452, 453, 455, 358/456, 458, 461, 462, 445, 447, 451, 474, 486; 382/54

[56] References Cited

U.S. PATENT DOCUMENTS

| 4,827,352 | 5/1989 | Yoneda et al. | 358/287 |
| 4,841,374 | 6/1989 | Kotani et al. | 358/280 |
| 4,942,479 | 7/1990 | Kanno | 358/445 |
| 4,953,036 | 8/1990 | Yoshimura | 358/400 |
| 4,958,238 | 9/1990 | Katayama et al. | 358/455 |
| 5,041,915 | 8/1991 | Hirota et al. | 358/407 |
| 5,050,227 | 9/1991 | Furusawa et al. | 358/448 |
| 5,134,503 | 7/1992 | Kimura | 358/448 |
| 5,144,456 | 9/1992 | Sakano | 358/448 |
| 5,220,620 | 6/1993 | Nakano et al. | 382/54 |
| 5,231,519 | 7/1993 | Koike | 358/445 |
| 5,231,677 | 7/1993 | Mita et al. | 358/447 |
| 5,235,436 | 8/1993 | Sakamoto et al. | 358/462 |
| 5,282,057 | 1/1994 | Mailloux et al. | 358/445 |

Primary Examiner—Edward L. Coles, Sr.
Assistant Examiner—Kimberly A. Williams
Attorney, Agent, or Firm—Popham Haik Schnobrich & Kaufman, Ltd.

[57] ABSTRACT

An image processing unit comprises an image scanning unit for scanning an original at a plurality of predetermined line densities, a smoothing unit for smoothing the intensity of each pixel, the intensity of each pixel being corrected to be the average intensity of a predetermined number of pixels surrounding each pixel in a predetermined pixel area, a binarizing unit for binarizing the corrected pixel by a half-tone processing, and a pixel area changing unit for changing the pixel area based on the line density employed by the image scanning unit. The intensity of each pixel may be corrected, by using pixels included in the predetermined pixel area, based on the existence of a pixel corresponding to a contour or a fine line in the original in the pixel area. A clear image of a mesh picture is obtained without generation of moiré, blurring of contours, or breaking of fine lines.

8 Claims, 11 Drawing Sheets

FIG. 2

| LINE DENSITY | EXTRACTED PIXEL | EQUATION |
|---|---|---|
| 8 × 7.7 LINE/mm | a: A B C / D X E / F G H | $X' = \dfrac{X+A+B+C+D+E+F+G}{8}$ |
| 8 × 15.4 LINE/mm | b: A B C / D E F / G X H / I J K / L M N / O P Q | $X' = \dfrac{X+A+B\,\text{----}\,+M+O+P}{16}$ |

FIG. 7

| EDGE DIRECTION | EQUATION |
|---|---|
| (grid a: A, D, F shaded) | $X' = \dfrac{3 \cdot X + B + C + E + G + H}{8}$ |
| (grid b: A, B, C shaded) | $X' = \dfrac{3 \cdot X + D + E + F + G + H}{8}$ |
| (grid c: A, B, D shaded) | $X' = \dfrac{3 \cdot X + C + E + F + G + H}{8}$ |

FIG. 10

| FINE LINE DIRECTION | EQUATION |
|---|---|
| a (A, B/, C / D, X/, E / F, G/, H — B, X, G shaded) | $X' = 3 \cdot X - (D+E)$ |
| b (A, B, C / D/, X/, E/ / F, G, H — D, X, E shaded) | $X' = 3 \cdot X - (B+G)$ |
| c (A, B, C/ / D, X/, E / F/, G, H — C, X, F shaded) | $X' = 3 \cdot X - (A+H)$ |

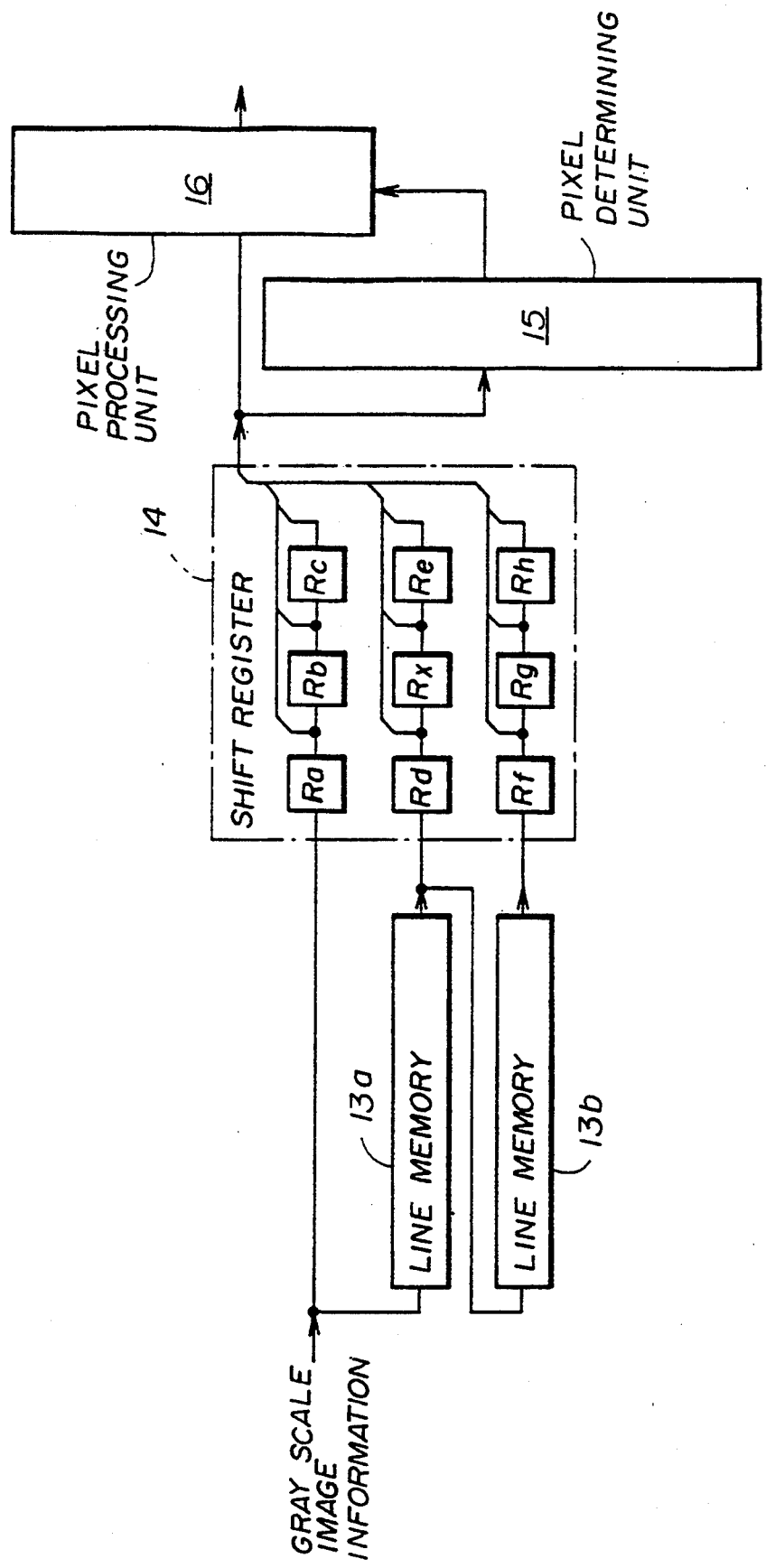

IMAGE PROCESSING UNIT PROCESSING PIXEL DATA ACCORDING TO SCAN LINE DENSITY

BACKGROUND OF THE INVENTION

The present invention generally relates to an image processing unit and more particularly to an image processing unit in which gray scale image information is converted into binary information by half-tone processing.

In various image processing units, when gray scale image information obtained by reading the intensities in an image such as a photograph is converted into binary information, the binary information is generally obtained by half-tone processing. The Dither method or the error diffusion method are known, for example, as such half-tone processing method.

When a mesh picture, which is, for example, seen in a printed photograph, is converted into binary information by using half-tone processing, moiré may be generated. In order to prevent the generation of moiré, there is a method in which gray scale image intensity information is smoothed prior to conversion into binary information. In this method, for example, image information comprising 9 pixels (vertical and horizontal 3×3) is repeatedly extracted, and image intensity information is smoothed by correcting the pixel positioned in the center of the 9 pixels to the average intensity of the extracted 9 pixels. Conventionally, the average intensity is computed by using a constant number of pixels, such as 3×3 pixels, and a uniform smoothing processing is performed over an entire page.

However, because the computation of the average intensity is performed by using an area defined by a constant number of pixels, fine parts of the picture are blurred when the image of a document is scanned with a coarse line density compared to the line density of the mesh picture. On the other hand, when the picture is scanned with a fine line density, the intensity changes are not sufficiently averaged and moiré remains. Further, since the smoothing is performed over the entire page, the contours in the picture are unclear.

SUMMARY OF THE INVENTION

It is a general object of the present invention to provide an improved and useful image processing unit in which the above mentioned disadvantages are eliminated.

A more specific object of the present invention is to provide an image processing unit in which a clear image of a mesh picture is obtained without generation of moiré.

In order to achieve the above mentioned objects, an image processing unit according to the present invention comprises:
- an image scanning means for scanning an original at a plurality of predetermined line densities line by line and outputting gray scale image information comprising pixels;
- a smoothing means for smoothing the intensity of each pixel in the gray scale image information, the intensity of each pixel being corrected to the average intensity among a predetermined number of pixels surrounding each pixel in predetermined pixel area;
- a binarizing means for binarizing the corrected pixel in the gray scale image information by a half-tone processing; and
- a pixel area changing means for changing the pixel area based on the line density employed by the image scanning means, the pixel area being decreased when the line density is coarse and the area being increased when the line density is fine so that the smoothing means performs the correction based on a constant pixel area.

Additionally, an image processing unit according to the present invention comprises:
- an image scanning means for scanning an original at a predetermined line density line by line and outputting gray scale image information comprising pixels;
- an edge-pixel determining means for determining the existence of an edge pixel which corresponds to a contour of the scanned picture;
- a smoothing means for smoothing the intensity of each pixel except for the edge pixels in the gray scale image information, the intensity of each pixel excluding the edge pixels being corrected to the average intensity among a predetermined number of pixels surrounding each pixel in a predetermined pixel area; and
- a binarizing means for binarizing each pixel including the edge pixels in the gray scale image information by means of half-tone processing.

Further, an image processing unit according to the present invention comprises:
- an image scanning means for scanning an original at a predetermined line density line by line and outputting gray scale image information comprising pixels;
- a directional edge-pixel determining means for determining the existence of edge pixels corresponding to a contour of the scanned picture in a predetermined pixel area, the predetermined pixel area being divided into two portions, one portion having intensities higher than the other portion;
- a smoothing means for smoothing the intensity of each pixel in the gray scale image information, the intensity of the each pixel being corrected to the average intensity of the divided portion in which the each pixel is included; and
- a binarizing means for binarizing the each pixels including the corrected edge pixel in the gray scale image information by means of a half-tone processing.

Further, an image processing unit according to the present invention comprises:
- an image scanning means for scanning an original at a predetermined line density line by line and outputting gray scale image information comprising pixels;
- a fine-line edge-pixel determining means for determining the existence of fine-line pixels in the gray scale image information, the fine-line pixel corresponding to a fine line of the scanned picture in a predetermined pixel area, the predetermined pixel area being divided into three portions, one portion positioned between the other two portions having intensities a predetermined value lower than the other portions;
- a correcting means for correcting the intensity of a fine-line pixel in the gray scale image information, the intensity of the fine-line pixel being corrected to be lower than the intensity of a pixel included in the other portions so that the intensity difference between the fine-line pixel and a pixel included in the other portions is enhanced; and a binarizing means for binarizing the each pixel including the corrected fine-line pixel in the gray scale image information by means of half-tone processing.

Other objects, features and advantages of the present invention will become more apparent from the following detailed descriptions when read in conjunction with the accompanying drawings.

BRIEF DESCRIPTION OF THE DRAWINGS

FIG. 2 is an illustration for explaining an operation of a smoothing unit in FIG. 1;

FIG. 7 is an illustration for explaining smoothing performed by a smoothing unit shown in FIG. 5;

FIG. 10 is an illustration for explaining a correction method of the MTF correcting unit; and FIG. 11 is a block diagram of an essential part of a circuit for the embodiments shown in FIGS. 3, 5 and 8.

DETAILED DESCRIPTION OF THE PREFERRED EMBODIMENTS

Figure 1:
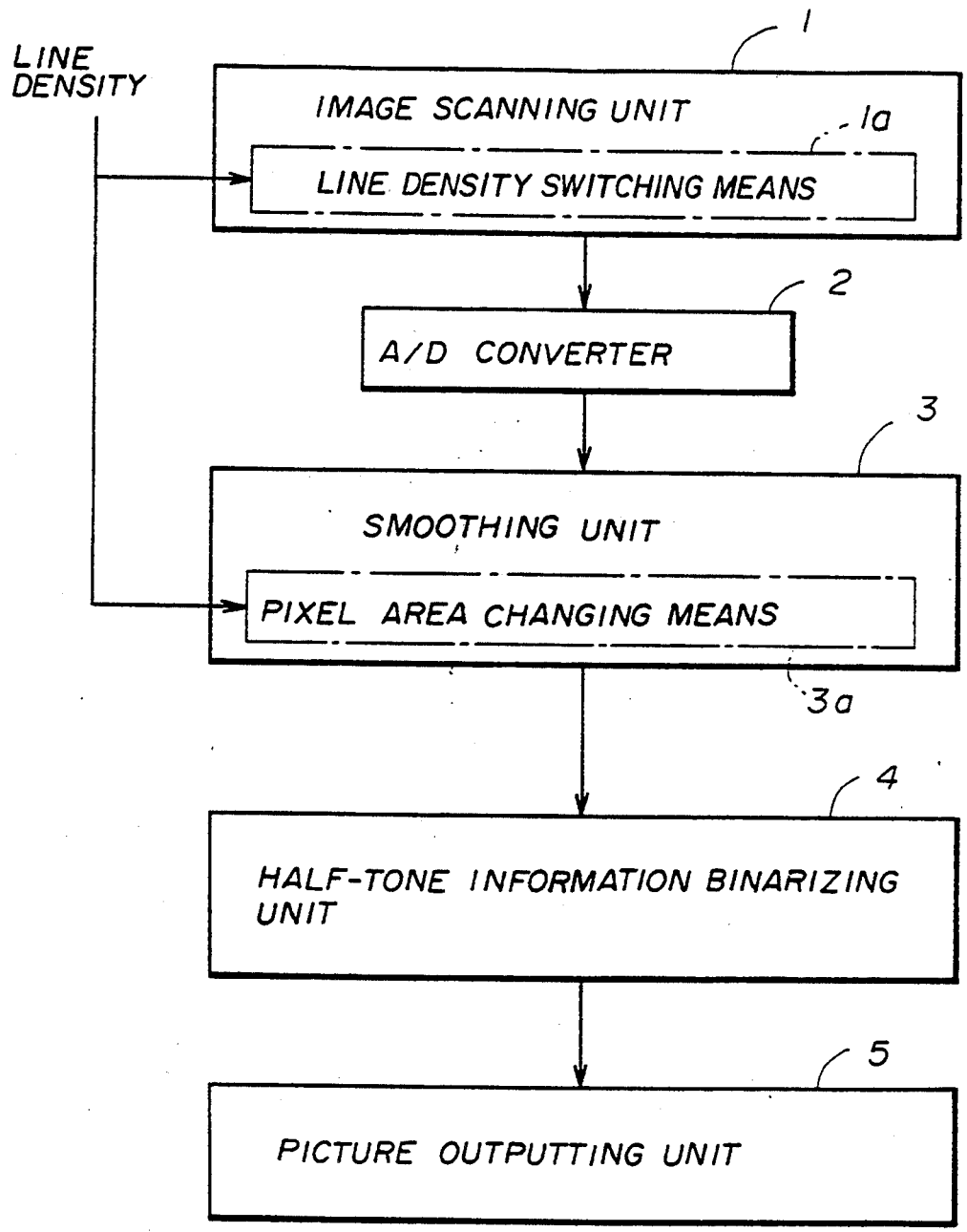
FIG. 1 is a block diagram of a first embodiment according to the present invention.

A description will be given, with reference to FIG. 1, of a first embodiment of an image processing unit according to the present invention. FIG. 1 is a block diagram of a first embodiment according to the present invention. An image scanning unit 1 scans an original line by line. The image scanning unit 1 has a line density switching means 1a for switching a line density for scanning between two modes. An analog/digital (A/D) converter 2 converts an analog image signal into a digital signal so as to obtain gray scale image information. A smoothing unit 3 smoothes intensity changes of the gray scale image information. This smoothing operation is performed by computing the average intensity of an area comprising a constant number of pixels. The smoothing unit 3 is provided with a pixel area changing means 3a for changing the area for two different cases.

A half-tone binarizing unit 4 converts the gray scale image information into binary information by using a known half-tone processing method such as the error diffusion method. A picture outputting unit 5 displays or records the binary image information.

This embodiment has a function in which a picture can be read by two different line densities, such as 8×7.7 lines/mm or 8×15.4 lines/mm.

When using this image processing unit, an operator selects the desired line density from the above two line densities.

When an operation of the apparatus starts, information for the selected line density is input to the line density switching means 1a and the pixel area changing means 3a. Then the image scanning unit 1 starts to scan an original in accordance with the selected line density so as to output scanned image signals line by line. The A/D converter 2 converts the image signals into gray scale image information having a predetermined gradation. The smoothing unit 3 receives the gray scale image signals corresponding to each line, and selects pixel one by one so as to extract a predetermined number of pixels surrounding each selected pixel. The smoothing unit 3 computes, in accordance with a predetermined algorithm, the average intensity of the surrounding pixels including the selected pixel and corrects the intensity of the selected pixel to the computed average intensity.

In this case, the method of extracting the surrounding pixels and the algorithm are changed on the basis of the scanning line density. For example, if the line density is 8×7.7 lines/mm, the smoothing unit 3 extracts, as shown in part a of FIG. 2, 8 pixels A to H surrounding the selected pixel X. The intensity of the selected pixel X is corrected to the average intensity X' obtained by the following equation. It should be noted that "A, B, . . ." of pixel A, B, etc. hereinafter represent the intensity of each pixel.

$$X' = (X+A+B+C+D+E+F+G)/8 \quad (1)$$

If the line density is 8×15.4 lines/mm, the smoothing unit 3 extracts, as shown in part b of FIG. 2, 17 pixels A to Q surrounding the selected pixel X. The intensity of the selected pixel X is corrected to the average intensity X' obtained by the following equation.

$$X' = (X+A+B\cdots+M+O+P)/16 \quad (2)$$

It should be noted that in the above two equations, the reason why the average intensity is computed based on 8 pixels (pixel H is excluded) or 16 pixels (pixel N and Q are excluded) is in that it is preferable that the denominator in each equation is the third power of 2 (=8) or the fourth power of 2 (=16) so that the equation is convenient for use by a computer using a binary processing.

The smoothing unit 3 outputs the gray scale image information in which each pixel is corrected by the above method.

The half-tone binarizing unit 4 converts the gray scale image information into binary information by using half-tone processing such as the error diffusion method.

As mentioned above, in the present embodiment, the intensity of the selected pixel is corrected to an average intensity determined by averaging the selected pixel and some of the pixels surrounding the selected pixel. When the scanned picture has a line density of 8×7.7 lines/mm, a total of eight pixels (including the selected pixel) are averaged (see Formula (1), above); when the line density of the scanned picture is 8×15.4 lines/mm, a total of sixteen pixels (including the selected pixel) are averaged (see Formula (2), above).

Accordingly, in both the coarse and the fine line density modes, each pixel of the gray scale image information is corrected to the average intensity of the same size area of the original. Thus, unclearness of the picture in the case of coarse line density or generation of moiré in the case of fine line density, can be prevented.

It should be noted that although the present embodiment employs two line densities, 8×7.7 lines/mm and 8×15.4 lines/mm, different line densities or more than two line densities may be employed. In such a case, the number of extracted pixels should be changed so that the size of the area represented by the extracted pixels is constant regardless of the employed line density.

Figure 3:
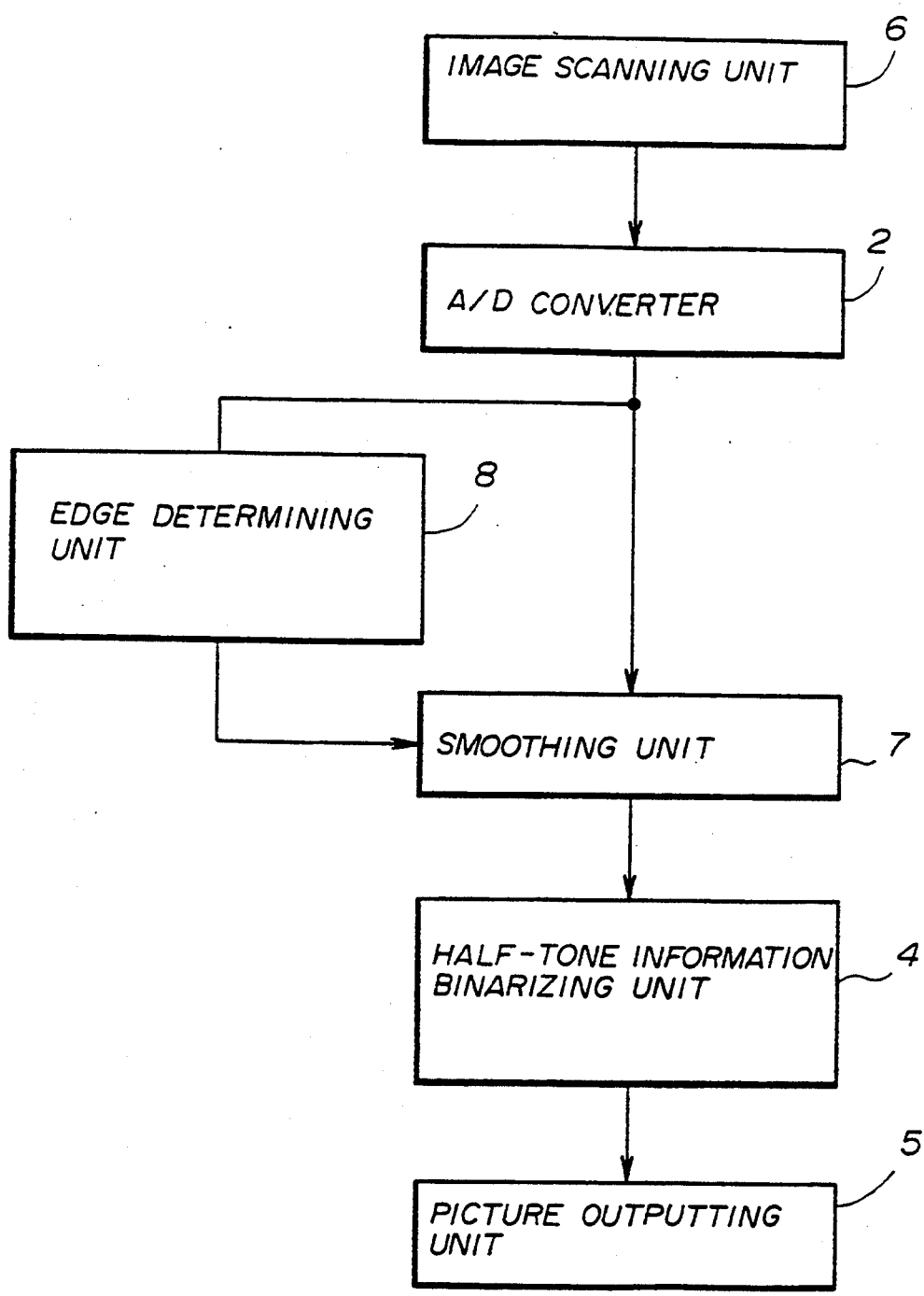
FIG. 3 is a block diagram of a second embodiment of an image processing unit according to the present invention.

FIG. 3 is a block diagram of a second embodiment of an image processing unit according to the present invention. In FIG. 3, the parts that are the same as those shown in FIG. 1 are given the same reference numerals, and descriptions thereof will be omitted. In this embodiment, an image scanning unit 6 scans an original at a constant speed, and a smoothing unit 7 performs a smoothing operation using a single processing method. An edge determining unit 8 detects edge pixels, which correspond to a contour in a picture, in the gray scale image information output by an A/D converter.

When an operation of the present embodiment starts, the image scanning unit 6 scans an original line by line, and sends the scanned image information to the A/D converter 2. The A/D converter 2 outputs the gray scale image information converted from the scanned image information. The edge determining unit 8 receives the gray scale image information, and selects, in turn, one pixel X and extracts, as shown by part a in FIG. 2, 8 pixels A to H surrounding the selected pixel X. The edge determining unit 8 then determines whether or not the selected pixel X is an edge pixel. This edge pixel is a pixel that corresponds to a contour in the picture.

Figure 4:
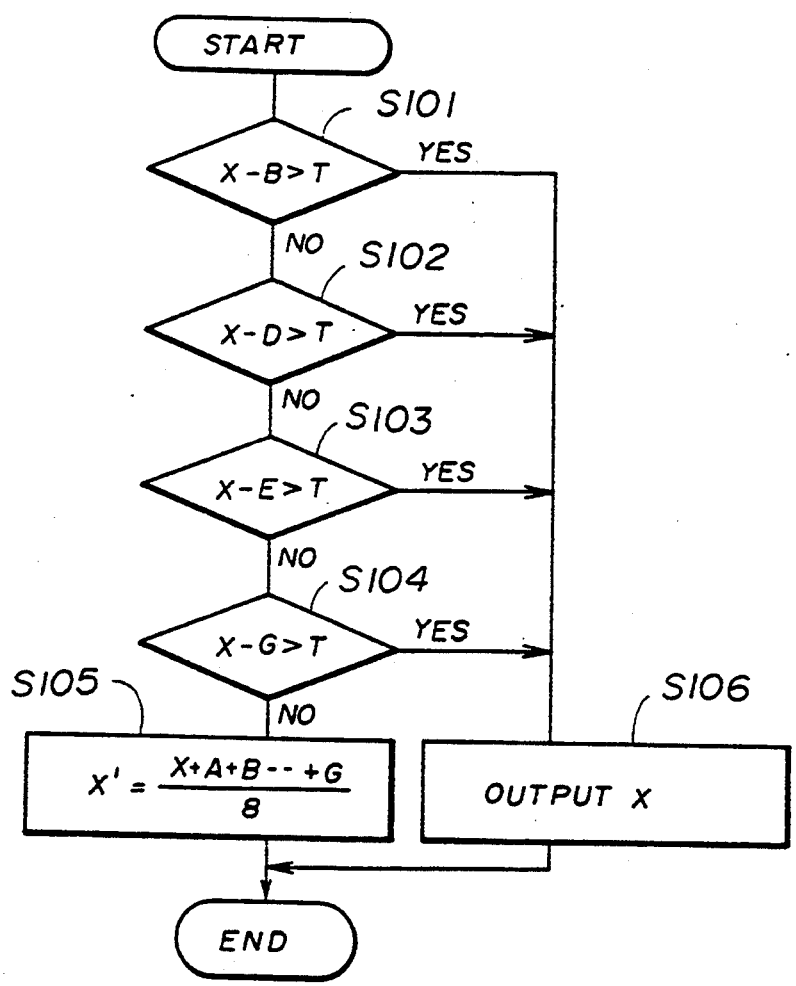
FIG. 4 is a flow chart of a routine performed by an edge determining unit shown in FIG. 3.

FIG. 4 is a flow chart of an edge determining routine performed by the edge determining unit shown in FIG. 3. When the routine starts, the edge determining unit 8 computes, in step S101, the intensity difference (X−B) between the selected pixel X and the pixel B, and judges whether or not (X−B) is greater than a predetermined value T. When (X−B) is equal to or less than T, the routine proceeds to step S102 where the intensity difference (X−D) between the selected pixel X and the pixel D is compared with the predetermined value T. When (X−D) is equal to or less than T, the routine proceeds to step S103 where the intensity difference (X−E) between the selected pixel X and the pixel E is compared with the predetermined value T. When (X−E) is equal to or less than T, the routine proceeds to step S104 where the intensity difference (X−G) between the selected pixel X and the pixel G is compared with the predetermined value T.

If the intensity difference (X−G) is equal to or less than the predetermined value T, it is determined that the selected pixel X is not an edge pixel. In this case, the routine proceeds to step S105 where the average intensity X' is computed and the intensity of the selected pixel X is replaced by X', and the routine ends.

On the other hand, if one of the above intensity differences (X−B), (X−D), (X−E), or (X−G) exceeds the predetermined value T, it is judged that the selected pixel X is an edge pixel and the routine immediately proceeds to step S106 where X is output without correction, and then the routine ends.

As mentioned above, the smoothing unit 7 performs a smoothing for the pixel that is not an edge pixel while a pixel that is an edge pixel is output without performing a smoothing. The half-tone binarizing unit 4 binarizes the gray scale image information processed by the smoothing unit 7, and the picture outputting unit 5 displays the binary image information.

In the present embodiment, since each pixel of the gray scale image information is examined to determine whether or not it is an edge pixel, and a smoothing is not performed when the pixel is determined to be an edge pixel, it is prevented that contours in a picture become blurred. Additionally, if a pixel is determined as a non-edge pixel, smoothing is applied to the pixel, and thus generation of moiré is prevented when the original is a mesh picture.

Figure 5:
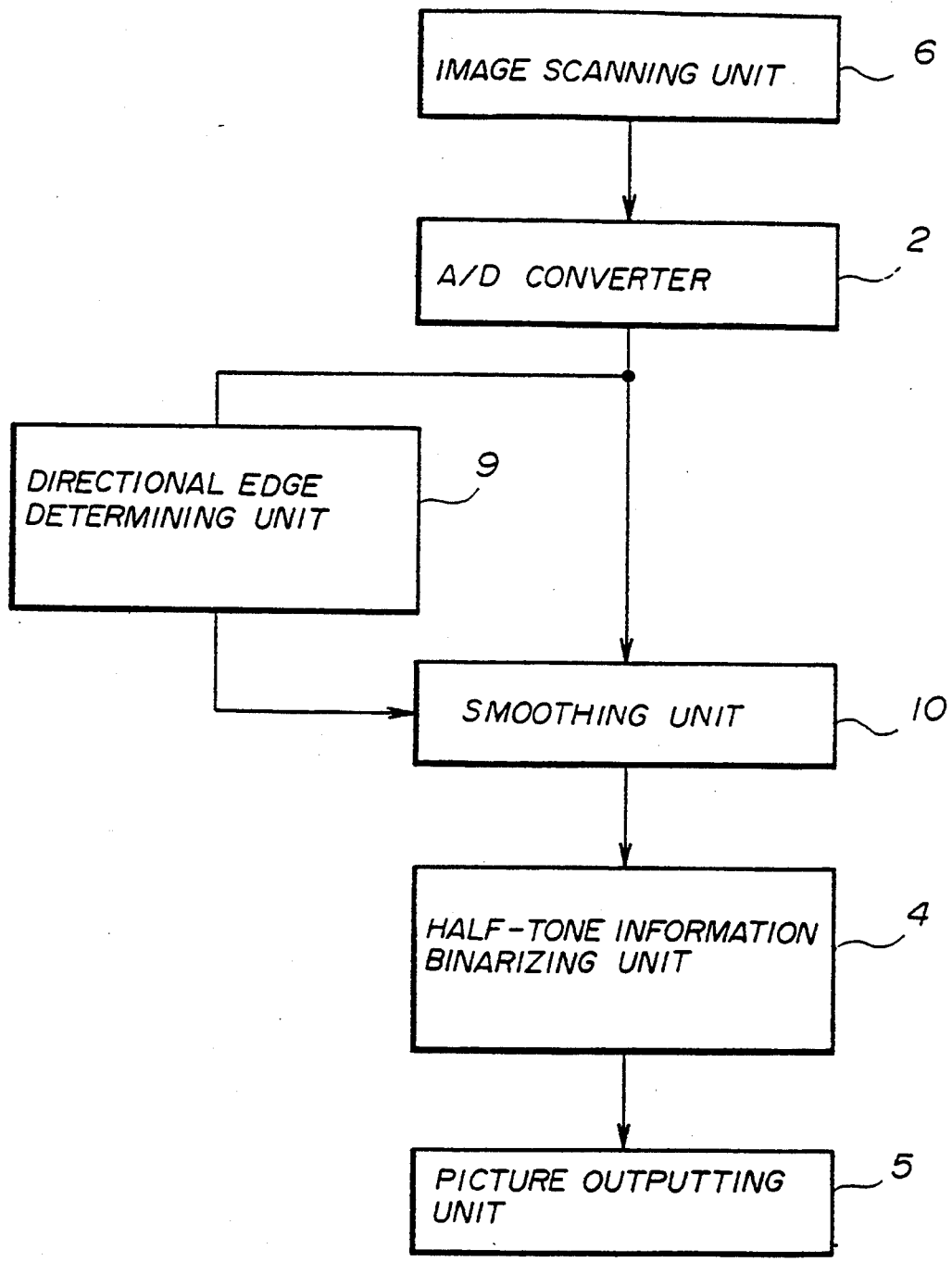
FIG. 5 is a block diagram of a third embodiment of an image processing unit according to the present invention.

FIG. 5 is a block diagram of a third embodiment of an image processing unit according to the present invention. In FIG. 5, the parts that are the same as those shown in FIG. 3 are given the same reference numerals, and descriptions thereof will be omitted. The third embodiment shown in FIG. 5 is provided with a directional edge determining unit 9 instead of the edge determining unit 8 of the second embodiment. Additionally, a smoothing unit 10, which has an operation different from the smoothing unit 7 of the second embodiment, is provided.

The directional edge determining unit 9 determines whether or not each pixel is an edge pixel. Additionally, if the pixel is determined as an edge pixel, the edge determining unit 9 determines in which direction the high intensity area corresponding to the contour of the image is positioned with respect to the pixel being examined, and then outputs the result.

Figure 6:
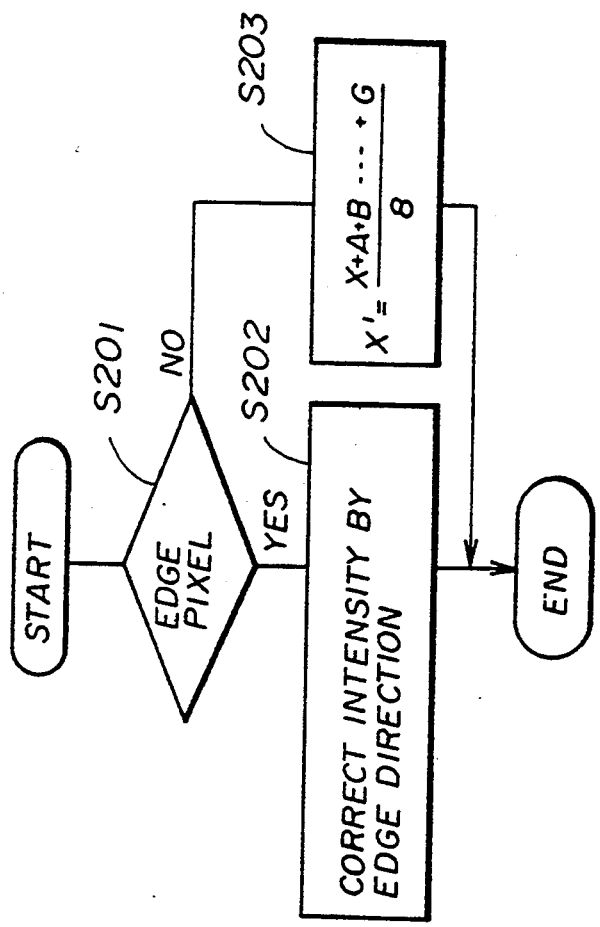
FIG. 6 is a flow chart of a routine performed by the smoothing unit shown in FIG. 5.

FIG. 6 is a flow chart of a routine performed by the smoothing unit 10. When the routine starts, in step S201, it is judged whether or not the input pixel is an edge pixel. When it is judged that the pixel is an edge pixel, in step S201, the routine proceeds to step S202 where the intensity of the pixel is corrected in accordance with the direction in which the edge faces, which is explained below.

FIG. 7 is an illustration for explaining smoothing performed by the smoothing unit 10 shown in FIG. 5. The illustration indicated by part a in FIG. 7 shows a state where the intensities of pixels A, D, and F are higher than the intensities of the other pixels B, C, X, E, G, and H, that is, a contour of the picture is positioned to the left of the selected pixel X. In this case, the intensity of the selected pixel X is corrected to X' obtained by the following equation.

$$X' = (3*X + B + C + E + G + H)/8$$

The illustration indicated by part b in FIG. 7 shows a state where the intensities of the other pixels A, B, and C are higher than the intensities of the other pixels X, D, E, F, G, and H, that is, a contour of the picture is positioned above the selected pixel X. In this case, the intensity of the selected pixel X is corrected to X' obtained by the following equation.

$$X' = (3*X + D + E + F + G + H)/8$$

When a contour of the picture is positioned below or on the right side of the selected pixel X, the intensity of the pixel X is corrected in a similar way to the above.

The illustration indicated by part c in FIG. 7 shows a state where the intensities of pixels A, B, and D are higher than the intensities of the other pixels C, X, E, F, G, and H, that is, a contour of the picture is positioned to the upper left of the selected pixel X. In this case, the intensity of the selected pixel X is corrected to X' obtained by the following equation.

$$X'=(3*X+C+E+F+G+H)/8$$

When a contour of the picture is positioned to the upper right, the lower right or the lower left of the selected pixel X, the intensity of the pixel X is corrected in a similar way as to that mentioned above.

The half-tone binarizing unit 4 binarizes the gray scale image information corrected by the above-mentioned method, and the picture outputting unit 5 displays the binary image information.

In the present embodiment, as shown by parts a, b, and c in FIG. 7, it is determined whether or not the pixel area comprising 3×3 pixels is divided by the intensity difference, that is, whether or not there are pixels corresponding to a contour of the picture. When it is determined that there are pixels corresponding to a contour of the picture, the intensity of the selected pixel is corrected to the average intensity of the pixels other than the pixels corresponding to a contour of the picture.

By performing the above mentioned operation, smoothing is performed outside the contour of the picture. Accordingly in the case that a character is printed on a mesh picture, for example, generation of moiré of the mesh picture can be prevented while the character remains clearly defined.

It should be noted that, in the present embodiment, although the intensity of the selected pixel is corrected when the selected pixel positions are in the lower intensity part, the correction may be made when the selected pixel is positioned in the higher intensity part or the correction may be made when the selected pixel is positioned in either part.

Figure 8:
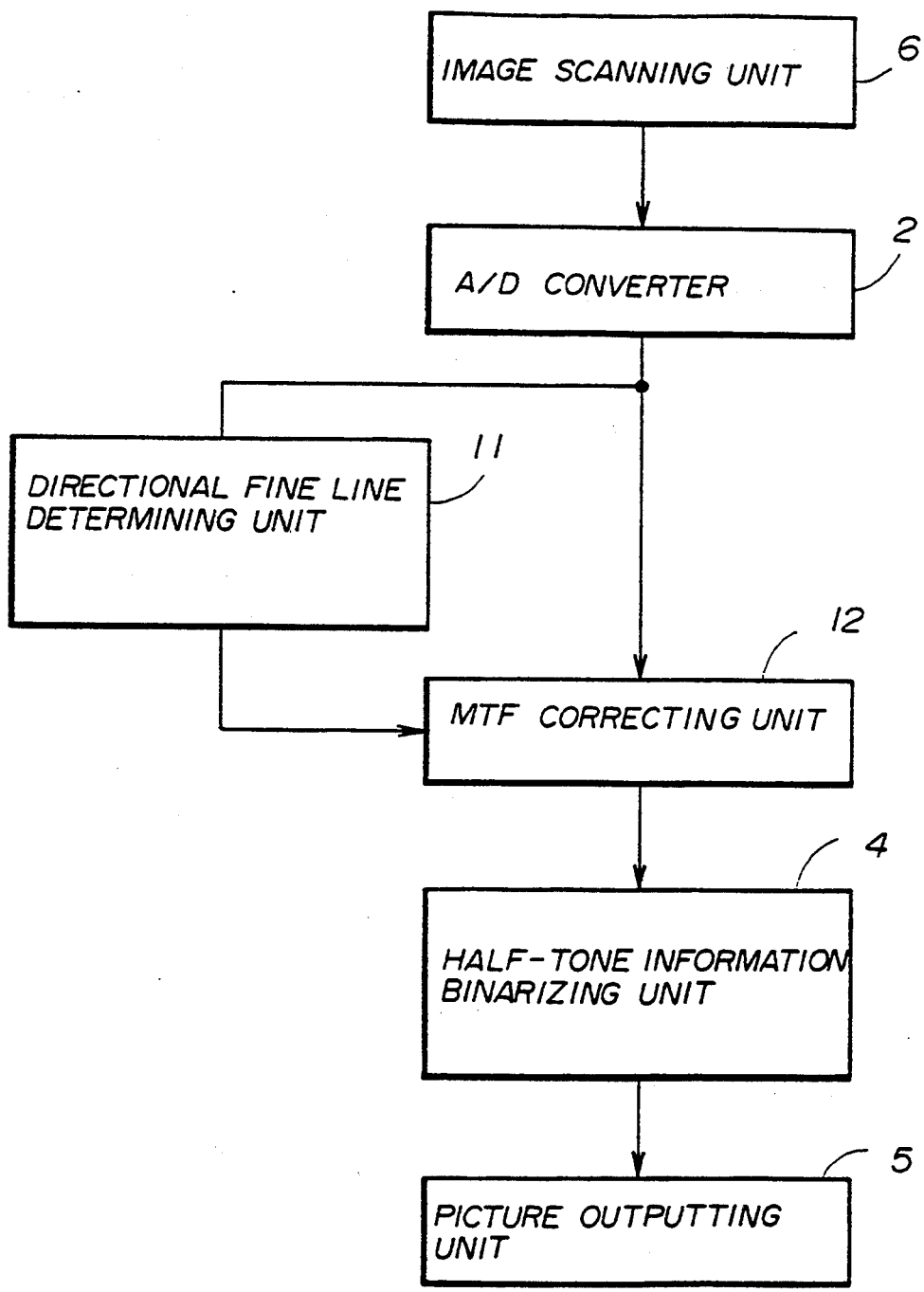
FIG. 8 is a block diagram of a fourth embodiment of an image processing unit according to the present invention.

FIG. 8 is a block diagram of a fourth embodiment of an image processing unit according to the present invention. In FIG. 8, the parts that are the same as the parts shown in FIG. 3 are given the same reference numerals, and descriptions thereof will be omitted. The fourth embodiment shown in FIG. 8 is provided with a directional fine line determining unit 11 and a modulation transfer function (MTF) correcting unit 12 instead of the directional edge determining unit 9 and the edge determining unit 10 of the third embodiment.

In this embodiment, when the image processing apparatus starts, similarly to the previously mentioned embodiments, gray scale image information is output from the A/D converter 2. The directional fine line determining unit 11 determines whether or not each pixel corresponds to a fine line in the original. When it is determined that the pixel corresponds to a fine line, the directional fine line determining unit 11 determines the extending direction of the fine line, and outputs the result.

Figure 9:
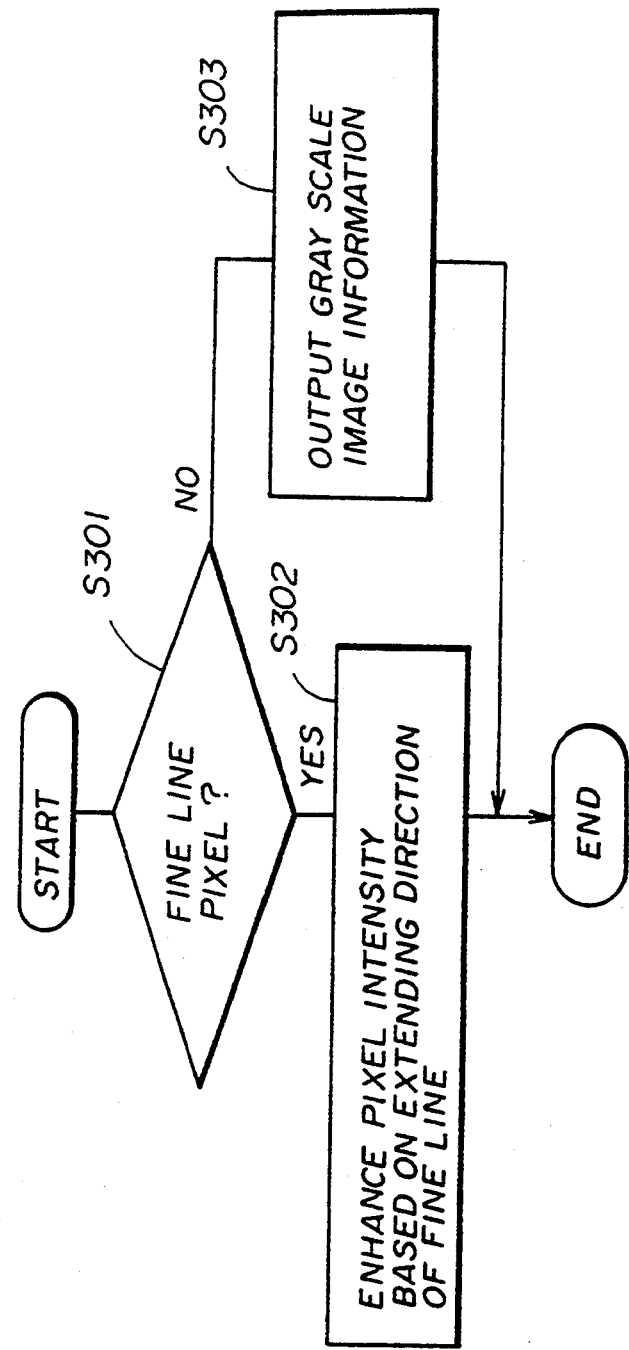
FIG. 9 is a flow chart of an operation performed by an MTF correcting unit shown in FIG. 8.

FIG. 9 is a flow chart of an operation performed by the MTF correcting unit 12. The MTF correcting unit 12 receives the gray scale image information and the result output from the directional fine line determining unit 11, and determines, in step S301, whether or not the selected pixel corresponds to a fine line. If it is determined that the pixel is a fine line pixel, the intensity of the pixel is corrected, in step S302, in accordance with the extending direction of the fine line which is explained below, and the routine ends. On the other hand, if the pixel is not a fine line pixel, the routine proceeds to step S303 where the gray scale image information is output, and the routine ends.

FIG. 10 is an illustration for explaining the correction method of the MTF correcting unit 12. The illustration indicated by part a in FIG. 10 shows a state where the intensities of pixels B, X, and G are higher than the intensities of the other pixels A, C, D, E, F, and H, that is, a fine line of the picture extends in a vertical direction passing through the selected pixel X. In this case, the intensity of the selected pixel X is corrected to X' obtained by the following equation.

$$X'=3*X-(D+E)$$

The illustration indicated by part b in FIG. 10 shows a state where the intensities of pixels D, X, and E are higher than intensities of the other pixels A, B, C, F, G, and H, that is, a fine line of the picture extends in a horizontal direction passing through the selected pixel X. In this case, the intensity of the selected pixel X is corrected to X' obtained by the following equation.

$$X'=3*X-(B+G)$$

The illustration indicated by part c in FIG. 10 shows a state where the intensities of pixels C, X, and F are higher than the intensities of the other pixels A, B, D, E, G, and H, that is, a fine line of the picture extends in a slanting direction passing through the selected pixel X from lower left to upper right. In this case, the intensity of the selected pixel X is corrected to X' obtained by the following equation.

$$X'=3*X-(A+H)$$

When a fine line extends from the lower right to upper left, a correction is made in a similar way to the correction for the fine line extending from lower left to upper right.

As mentioned above, in the present embodiment, it is determined whether or not each pixel corresponds to a fine line pixel. If the pixel corresponds to a fine line pixel, the intensity of the pixel is enhanced with respect to the two adjacent pixels positioned in the direction perpendicular to the fine line. Accordingly, a clear fine line of the picture is printed by enhancing the intensity of the pixel, and thus a break in a fine line is prevented.

FIG. 11 is a block diagram of an essential part of a circuit for the above mentioned embodiments. Each of the line memories 13a, 13b stores gray scale image information corresponding to one line. A shift register 14 comprises nine registers $R_x$ and $R_a$ to $R_h$, and extracts pixels X and A to H, as described in the descriptions for the above embodiments, from the gray scale image information.

A description will be given below of the operation of the circuit shown in FIG. 11. When gray scale image information is output by the A/D converter, firstly, the information corresponding to one line (first line image information) is supplied to the line memory 13a. When the next line image information (second line image information) is supplied to the line memory 13a, the first line image stored in the line memory 13a is transferred to the line memory 13b. Then the next line image information (third line image information) is supplied to shift register 14.

The registers $R_a$, $R_b$, and $R_c$ provided in the shift register 14 temporarily store, in turn, each pixel information in the third line image information supplied by the A/D converter. The registers $R_d$, $R_x$, and $R_e$ provided in the shift register 14 temporarily store, in turn, each pixel in the second line image information supplied by the line memory 13a. The registers $R_f$, $R_g$, and $R_h$ provided in the shift register 14 temporarily store, in turn, each pixel in the first line image information supplied by the line memory 13b.

The shift register 14, in turn, outputs the set of nine pixels stored in the registers $R_x$ and $R_a$ to $R_h$ to the pixel determining unit 15 and the pixel processing unit 16. Accordingly, nine pixels, X and A to H, are obtained from the gray scale image information.

The pixel determining unit 15 performs the above mentioned various determinations for the selected pixel X by using the extracted pixels A to H. For example, in the above mentioned second and third embodiments, it is determined whether or not the pixel X is an edge pixel. In the fourth embodiment, it is determined whether or not the pixel X is a fine line pixel.

The pixel processing unit 16 performs a correction on the selected pixel X in accordance with the determination made by the pixel determining unit 15. For example, in the above mentioned second and third embodiments, a smoothing is performed, if necessary, on the selected pixel X. In the fourth embodiment, if necessary, the intensity of the selected pixel X is enhanced.

The shift register 14 supplies of the extracted pixels to both the pixel determining unit 15 and pixel processing unit 16; this results in reduction of manufacturing costs compared to a structure in which a separate pixel extraction unit is provided to the pixel determining unit 15 and the pixel processing unit 16.

It should be noted that although the above mentioned embodiments use eight or sixteen pixels to perform various determinations and corrections, the number of pixels to be extracted is not limited to the above specific numbers.

The present invention is not limited to the specifically disclosed embodiments, and variations and modifications may be made without departing from the scope of the present invention.

What is claimed is:

1. An image processing unit comprising:
   a) an image scanning means for scanning an original at a plurality of predetermined line densities line by line and for outputting pixel data as gray scale image information;
   b) a smoothing means for smoothing the pixel data so that an intensity of each pixel is corrected to an average intensity of a predetermined number of pixels, the predetermined number of pixels including and surrounding each pixel in a predetermined pixel area;
   c) a binarizing means for using half-tone processing to binarize each pixel data smoothed by said smoothing means; and
   d) a pixel area changing means for changing the pixel area based on a line density of the plurality of line densities to be employed by said image scanning means, wherein:
      1) the pixel area is decreased when the line density is coarse; and
      2) the area is increased when the line density is fine;
   so that said smoothing means performs the correction based on a constant pixel area.

2. The image processing unit as claimed in claim 1, wherein said plurality of line densities includes $8 \times 7.7$ lines/mm and $8 \times 15.4$ lines/mm, and said pixel area includes 9 pixels when said line density is $8 \times 7.7$ lines/mm and said pixel area includes 18 pixels when said line density is $8 \times 15.4$ lines/mm.

3. The image processing unit as claimed in claim 1, wherein the number of pixels used for the correction performed by said smoothing means is the nearest power of 2 to said predetermined number of pixels that is less than said predetermined number of pixels.

4. An image processing unit comprising:
   a) an image scanning means for scanning an original at a predetermined line density line by line and for outputting pixel data as gray scale image information;
   b) an edge-pixel determining means for determining whether or not each of the pixel data corresponds to an edge pixel which corresponds to a contour in the scanned original,
   wherein a given pixel data is determined to correspond to an edge pixel when a difference (I)–(II) defined as:
      (I) the intensity the given pixel, minus
      (II) an intensity of at least one of pixels surrounding each of the pixels, is greater than a predetermined value;
   c) a smoothing means for smoothing the pixel data, wherein:
      1) the intensity of the given pixel that is determined not to correspond to an edge pixel is corrected to be the average intensity of a predetermined number of pixels surrounding the given pixel in a predetermined pixel area; and
      2) a smoothing operation is not performed on pixel data determined to correspond to an edge pixel; and
   d) a binarizing means for using half-tone processing to binarize the pixel data corresponding to said first and said second pixels.

5. An image processing unit comprising;
   a) an image scanning means for scanning an original at a predetermined line density line by line and for outputting pixel data as gray scale image information;
   b) a directional edge-pixel determining means for determining whether or not all pixels included in a first portion of a predetermined pixel area are edge pixels corresponding to a contour of the scanned picture, the predetermined pixel area being divided into said first portion and a second portion excluding said first portion, and including a pixel to be processed in the center thereof, said first portion being defined to be a portion along a side of the predetermined pixel area;
   c) a smoothing means for smoothing the pixel data so that the intensity of the pixel to be processed is corrected to an average intensity of the second portion when it is determined by said directional edge-pixel determining means that all pixels in said first portion are edge pixels; and
   d) a binarizing means for using half-tone processing to binarize the pixel data which has been smoothed by said smoothing means.

6. An image processing unit comprising:
   a) an image scanning means for scanning an original at a predetermined line density line by line and for outputting pixel data in gray scale image information;

b) a fine-line edge-pixel determining means for determining whether or not the pixel data corresponds to a fine-line pixel, the fine-line pixel corresponding to a fine line in the scanned picture in a predetermined pixel area, the predetermined pixel area being divided into three portions, one portion positioned between the other two portions having intensities a predetermined value higher than the other portions;

c) a correcting means for correcting the pixel data so that the intensity of the fine-line pixel is corrected to be lower than the intensity of one pixel included in the other portions so that the intensity difference between the fine-line pixel and one pixel included in the other portions is enhanced; and d) a binarizing mean for using half-tone processing to binarize each pixel data including pixel data corrected by said correcting means.

7. The image processing unit as claimed in claim 6, wherein said intensity of said fine-line pixel is corrected by using two pixels adjacent to said fine-line pixel.

8. The image processing unit as claimed in claim 7, wherein each of said two pixels are positioned along a line perpendicular to the alignment direction of said fine line pixels and are positioned opposite to each other with respect to said fine-line pixel being corrected.

* * * * *